(12) United States Patent
Collins et al.

(10) Patent No.: US 10,541,860 B2
(45) Date of Patent: Jan. 21, 2020

(54) FILTERING A LARGE GROUP OF DEVICES

(71) Applicant: General Electric Company, Schenectady, NY (US)

(72) Inventors: Clifford A. Collins, Dublin, CA (US); Wai Loon Fong, Livermore, CA (US); Karel Barnoski, Dublin, CA (US); Peter Ingulli, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 15/678,969

(22) Filed: Aug. 16, 2017

(65) Prior Publication Data

US 2019/0058627 A1  Feb. 21, 2019

(51) Int. Cl.
*H04L 12/24* (2006.01)
*G06F 17/30* (2006.01)
*H04W 4/00* (2018.01)
*H04L 29/08* (2006.01)
*H04W 4/38* (2018.01)
*G06F 16/248* (2019.01)
*G06F 16/9535* (2019.01)
*G05B 19/418* (2006.01)

(52) U.S. Cl.
CPC ........ *H04L 41/0613* (2013.01); *G06F 16/248* (2019.01); *H04L 67/12* (2013.01); *H04W 4/38* (2018.02); *G05B 19/41885* (2013.01); *G06F 16/9535* (2019.01); *H04L 41/12* (2013.01); *H04L 41/22* (2013.01)

(58) Field of Classification Search
CPC ............... G06F 16/248; G06F 16/9535; H04L 41/0613; H04L 41/12; H04L 41/22; H04L 67/12; H04W 4/38; G05B 19/41885
See application file for complete search history.

(56) References Cited

U.S. PATENT DOCUMENTS

| | | | |
|---|---|---|---|
| 2010/0332652 A1* | 12/2010 | Bhattacharya | H04L 41/069 709/224 |
| 2012/0054650 A1* | 3/2012 | Bliss | G05B 19/042 715/764 |
| 2015/0372855 A1* | 12/2015 | Kushmerick | H04L 41/0613 709/224 |
| 2016/0127180 A1* | 5/2016 | Shcherbakov | G06F 3/0482 715/735 |

(Continued)

*Primary Examiner* — Philip J Chea
*Assistant Examiner* — Ruth Solomon
(74) *Attorney, Agent, or Firm* — Fitch Even Tabin & Flannery LLP

(57) ABSTRACT

Systems and methods for filtering a large group of devices are presented. In an example embodiment, a value is accessed for each of a plurality of attributes for each of a plurality of devices. Also accessed is a filter set including one or more filters. Each of the filters comprises one of the attributes, a filter value, and a relational operator relating the attribute to the filter value. The attribute of at least one of the filters indicates an event applicable to individual devices, and a corresponding filter value indicates whether to filter the devices based on the presence or absence of a previous occurrence of the event. The filter set is compared to the attributes of each of the devices to identify those of the devices that satisfy all of the filters of the filter set. A representation of at least some of the identified devices is displayed.

20 Claims, 15 Drawing Sheets

(56) References Cited

U.S. PATENT DOCUMENTS

| | | | | |
|---|---|---|---|---|
| 2016/0321369 | A1* | 11/2016 | Neels | G06F 16/338 |
| 2017/0091972 | A1* | 3/2017 | Pearcy | H04L 41/0893 |
| 2017/0140039 | A1* | 5/2017 | Neels | G06F 16/338 |
| 2017/0141968 | A1* | 5/2017 | Lloyd | H04L 41/22 |
| 2017/0155538 | A1* | 6/2017 | Tee | H04L 41/065 |
| 2017/0277171 | A1* | 9/2017 | Asenjo | G05B 19/4185 |
| 2018/0019933 | A1* | 1/2018 | Ueda | G01R 31/08 |
| 2018/0302272 | A1* | 10/2018 | Makovsky | H04L 41/0686 |
| 2018/0357058 | A1* | 12/2018 | Malaspina | G06F 8/65 |
| 2018/0359144 | A1* | 12/2018 | Malaspina | H04L 41/0843 |

* cited by examiner

DEVICE MANAGER

- DASHBOARD
- DEVICE MANAGER
- OPERATIONS
- REPOSITORY
- COMMANDS
- ANALYTICS
- CONNECTIVITY
- USER MANAGER
- SETTINGS

▽ SMART FILTERS

| REGION ▾ | EQUALS ▾ | NORTH AMERICA ▾ | ⊖ ⊕ |
| BOM ▾ | EQUALS ▾ | 1 ▾ | ⊖ ⊕ |

CANCEL   SAVE   APPLY

SELECTED (0)

| | STATUS | MODEL | NAME |
|---|---|---|---|
| ☐ | FILTER | FILTER | FILTER |
| ☐ | ● CREATED | (FA) | DEVICE 15243549８ |
| ☐ | ⊘ ONLINE | (M) | DEVICE 132089786 |
| ☐ | ⊘ ONLINE | (FA) | DEVICE 123098675 |
| ☐ | ① OFFLINE | (FA) | DEVICE 758675960 |
| ☐ | ① OFFLINE | (FA) | DEVICE 756998076 |
| ☐ | ① OFFLINE | (M) | DEVICE 352465746 |
| ☐ | ● CREATED | (P) | DEVICE 786990987 |
| ☐ | ⊘ ONLINE | (M) | DEVICE 463548997 |
| ☐ | ⊘ ONLINE | (M) | DEVICE 413231657 |
| ☐ | ⊘ ONLINE | (FA) | DEVICE 354625879 |

ROWS PER PA...

542 →
- 5 SAVED FILTER SETS
- DOCKER DEVICES
- FIELD AGENTS WITH LOW BATTERY
- MINI FIELD AGENTS RUNNING BOM 1
- ALL DEVICES WITH MEMORY AT CAPACITY
- ALL DEVICES WITH CRITICAL ALERTS

FIG. 5F (Rotated page showing Device Manager interface)

500F

DEVICE MANAGER

Sidebar:
- DASHBOARD
- DEVICE MANAGER
- OPERATIONS
- REPOSITORY
- COMMANDS
- ANALYTICS
- CONNECTIVITY
- USER MANAGER
- SETTINGS

| SELECTED (0) | STATUS | MODEL | NAME |
|---|---|---|---|
| | FILTER | FILTER | FILTER |
| ☐ | ● CREATED | (FA) | DEVICE 15243549880 |
| ☐ | ⊘ ONLINE | (M) | DEVICE 13208978671 |
| ☐ | ⊘ ONLINE | (FA) | DEVICE 12309867584 |
| ☐ | ⊘ OFFLINE | (FA) | DEVICE 75867596017 |
| ☐ | ⊘ OFFLINE | (FA) | DEVICE 75699807662 |
| ☐ | ⊘ OFFLINE | (M) | DEVICE 35246574645 |
| ☐ | ● CREATED | (P) | DEVICE 78699098767 |
| ☐ | ⊘ ONLINE | (M) | DEVICE 46354899707 |
| ☐ | ⊘ ONLINE | (M) | DEVICE 41323165787 |
| ☐ | ⊘ ONLINE | (FA) | DEVICE 35462587974 |

ROWS PER PA...

▽ SMART FILTERS

REGION ▼ | EQUALS ▼ | NORTH AMERICA ▼ | ⊖
BOM ▼ | EQUALS ▼ | 1 | ⊖ ⊕

CANCEL | SAVE | APPLY

SAVED FILTER SETS:
- DOCKER DEVICES
- FIELD AGENTS WITH LOW BATTERY
- MINI FIELD AGENTS RUNNING BOM 1
- ALL DEVICES WITH MEMORY AT CAPACITY
- ALL DEVICES WITH CRITICAL ALERTS

ADD — 546
— 544

FILTERING A LARGE GROUP OF DEVICES

TECHNICAL FIELD

Embodiments of the present disclosure relate generally to data processing and, more particularly, but not by way of limitation, to a method and system for filtering a large group (e.g., thousands or millions) of devices (e.g., for analysis, testing, upgrading, and other tasks).

BACKGROUND

As distributed computing systems continue to evolve, additional challenges in managing such systems continue to present themselves. In one example, many industry-related businesses (e.g., manufacturing companies, electrical utilities, transportation companies, etc.) are employing at least some aspects of the "industrial Internet" or the industrial "Internet of Things" (e.g., industrial IoT, or IIoT), such as sensors, processing systems, and other onsite devices, to help manage and employ industrial assets (e.g., power plants, wind turbines, jet engines, and so on) to maximize revenue generated by those assets. In some cases, the number of onsite devices deployed by a particular business may number in the thousands or millions, thereby taxing the ability of the business to monitor the capability upgrades, operational status, and other aspects of each device effectively.

BRIEF DESCRIPTION OF THE DRAWINGS

Various ones of the appended drawings merely illustrate example embodiments of the present disclosure and cannot be considered as limiting its scope.

FIGS. 5A through 5K are graphical depictions of a user interface presented to a user to filter multiple electronic devices.

The headings provided herein are merely for convenience and do not necessarily affect the scope or meaning of the terms used.

DETAILED DESCRIPTION

In the following description, for the purposes of explanation, numerous specific details are set forth in order to provide an understanding of various example embodiments of the present subject matter. It will be evident, however, to those skilled in the art, that example embodiments of the present subject matter may be practiced without these specific details.

Figure 1:
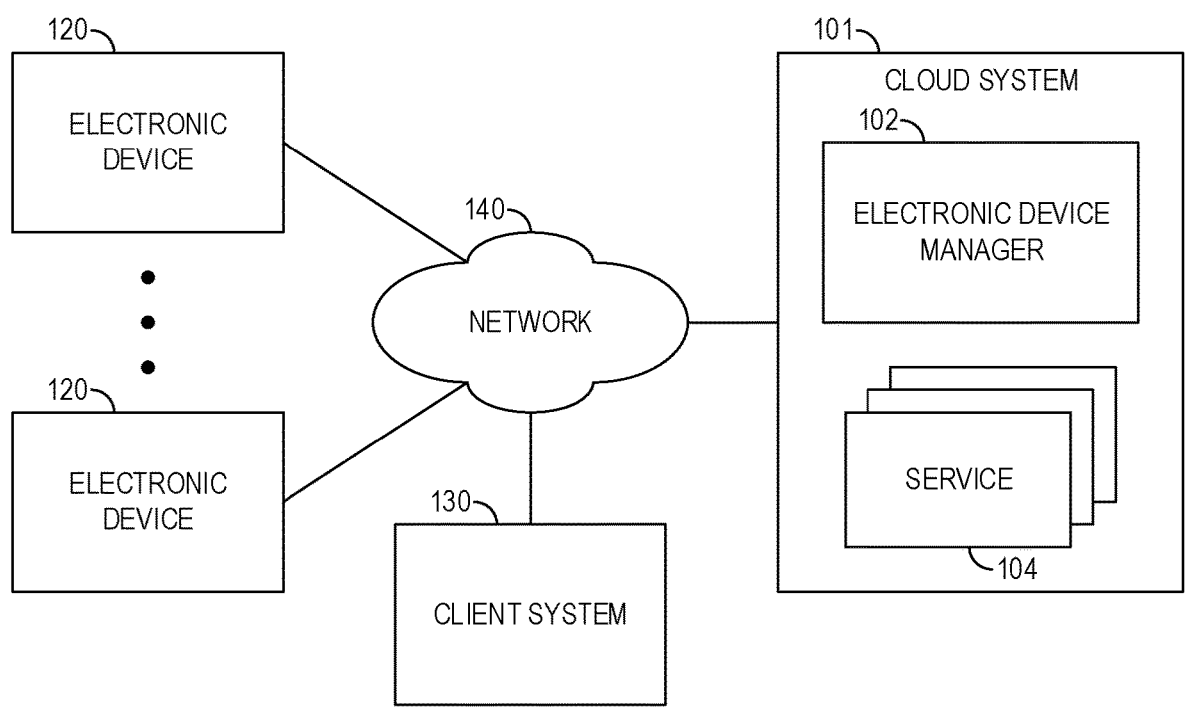
FIG. 1 is a block diagram of an example cloud system communicatively coupled via a network with multiple electronic devices and a client system.

FIG. 1 is a block diagram of a cloud system 101 including an electronic device manager 102 and one or more software services 104 available for use in conjunction with multiple electronic devices 120 that are communicatively coupled with the cloud system 101 via a communication network 140. Also depicted in FIG. 1 is a client system 130 that is also communicatively coupled with the communication network 140. While a single client system 130 is shown in FIG. 1, multiple client systems 130 may be present in other example embodiments. Moreover, while two (or more) electronic devices 120 are explicitly depicted in FIG. 1, many more electronic devices 120 (e.g., hundreds, thousands, or millions of electronic devices 120) may be communicatively coupled to the cloud system 101 and managed via the electronic device manager 102 in example embodiments.

Communicatively coupling the electronic devices 120 and the client system 130 to the cloud system 101 is the communication network 140, such as a wide area network (WAN) (e.g., the Internet). Other types of networks may also be included as part of the network 140, such as a local area network, (LAN), a wireless WAN (WWAN), a wireless LAN (WLAN), a cellular telephone network (e.g., a third-generation (3G) or fourth-generation (4G) network), another communication network or connection, or some combination thereof.

The client system 130, in an example embodiment, may be used by a customer of the cloud system 101 to manage the electronic devices 120 by communicating with the electronic device manager 102 via the client system 130. In an example embodiment, the electronic device manager 102 may provide a user interface that may be employed by the user via the client system 130 (e.g., via a web browser; a desktop computer, laptop computer, tablet computer, or smartphone application; or the like) to access the functionality of the electronic device manager 102. In example embodiments, the client system 130 may also be employed as a developer system to develop and test software on the cloud system 101 to be executed on the electronic devices 120, as well as to perform other functions involving the electronic devices 120, but such operations are not described in detail herein to simplify and focus the following discussion.

The electronic device manager 102 may be configured to communicate with each of the electronic devices 120 to authorize and/or authenticate the electronic device 120 for access to the cloud system 101, and to deploy applications and associated services 104 from the cloud system 101 to the electronic device 120 for execution thereon. The services 104 available, in example embodiments, may include authorization and authentication services, data transfer services, data processing services, messaging services, database services, and so on. In an example embodiment, the applications and associated services 104 may be placed in one or more software "containers," such as Docker® containers, and then transmitted via the communication network 140 to the electronic device 120 for execution thereon by way of a container engine, such as a Docker® engine. The electronic device manager 102, in example embodiments, may also initiate operations in the electronic devices 120, monitor operational status of the electronic devices 120, initiate processing of sensor data and other data received from the electronic devices 120, and so on.

Each of the electronic devices 120, in an example embodiment, may be a computing and/or communication system capable of executing an application and associated services 104 provided by and received from the cloud system 101. In a particular example embodiment, the cloud system 101 and each of the electronic devices 120 may work cooperatively as components of an industrial Internet, or industrial Internet of Things (IIoT). For example, the cloud system 101 may communicate with one or more electronic devices 120 located at one or more industrial sites (e.g., power plants, wind turbines, manufacturing sites, and so on) having one or more industrial assets. In such a system, each electronic device 120, which may be referred to as an IoT "edge" device, may perform one or more tasks, such as sensor data collection, sensor data processing, data transmission via the communication network 140 to the cloud system 101, industrial asset monitoring and control, and the like. In some example embodiments, each of hundreds, thousands, or millions of such electronic devices 120 may be managed using the electronic device manager 102 of the cloud system 101. In such embodiments, the electronic device manager 102 may be viewed as an edge device manager capable of managing the hundreds, thousands, or millions of IoT edge devices.

The electronic devices 120, in example embodiments, may represent a wide range of processing capability, data storage capacity, and other computing or processing characteristics. Consequently, some such electronic devices 120 may be capable of executing a particular application designed to receive and process asset sensor data and to transmit the results via the network 140 to the cloud system 101, while other electronic devices 120 may only have the capability of transmitting the received data, or some portion thereof, via the network 140 to the cloud system 101, upon which that same application may execute to perform the desired processing.

Consequently, given the possibly large number of electronic devices 120 to be managed by a particular customer via the electronic device manager 102, wherein each electronic device 120 may represent a particular mix of attributes, such as type of electronic device 120, current software version deployed on the electronic device 120, current operational status of the electronic device 120, and so on, various embodiments of the electronic device manager 102 described herein may provide a device filtering mechanism employable by the user to facilitate visualization of the current state of the electronic devices 120, as well as of previous events (e.g., complete or partial upgrades) involving or impacting the electronic devices 120.

Figure 2:
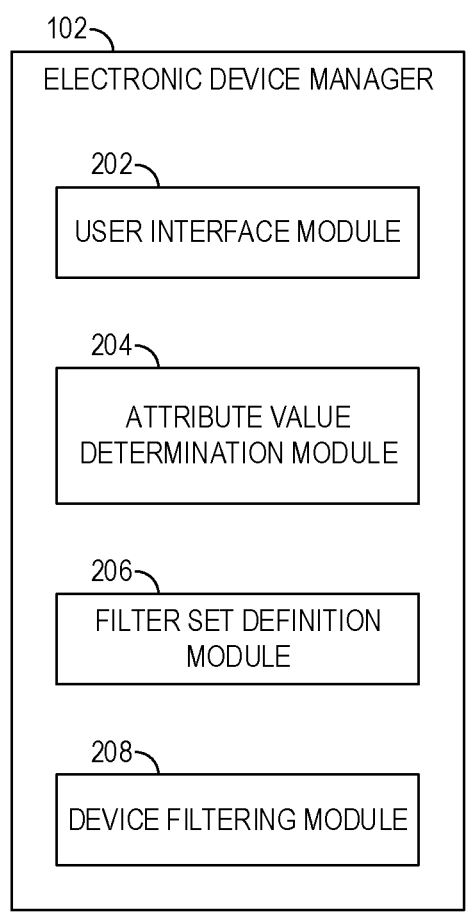
FIG. 2 is a block diagram of an example electronic device manager of the cloud system of FIG. 1.

FIG. 2 is a block diagram of an example embodiment of the electronic device manager 102 of the cloud system 101 of FIG. 1. As illustrated in the example embodiment of FIG. 2, the electronic device manager 102 may include a user interface module 202, an attribute value determination module 204, a filter set definition module 206, and a device filtering module 208. The electronic device manager 102 may include other modules or components, but such modules and components are not depicted in FIG. 2 to simplify the following discussion. Also, two or more modules 202-208 may be combined into fewer modules, and/or one or more modules 202-208 may be divided to yield a greater number of modules, in other example embodiments.

In an example embodiment, the user interface module 202 is configured to facilitate the monitoring and control of the electronic devices 120 via the electronic device manager 102 by a user (e.g., a customer) operating the client system 130. In example embodiments, the user interface module 202 may be a web-based interface accessed by way of a web browser application executing on the client system 130. In other example embodiments, the user interface module 202 may include an application programming interface (API) that may be accessible over the communication network 140 by the client system 130 executing a application (e.g., an "app") configured to communicate with the electronic device manager 102 using the API.

In conjunction with authorizing/authenticating the electronic device 120, deploying software (e.g., applications and services) to the electronic devices 120, initiating various operations at the electronic devices 120, monitoring the status of the electronic devices 120, and so on, the electronic device manager 102, via the user interface module 202, may be configured to facilitate filtering of the electronic devices 120, as directed by the user of the client system 130, thus allowing the user to either gain a better overall perspective of the status of the electronic devices 120, or to more easily investigate the status of those electronic devices 120 of particular interest to the user.

To facilitate the filtering of the electronic devices 120, the attribute value determination module 204 may be configured to access or otherwise receive an attribute value for each of a number of attributes associated with each of the electronic devices 120. In an example embodiment, example attributes for an electronic device 120 may include, but are not limited to, a device type, a device operational status, a device name or other identifier, a level or version of software currently deployed on the electronic device 120, a device geographic location, and the like. Moreover, in some example embodiments, the attributes may include an event (e.g., a software upgrade operation, a device failure or error condition, and so on) that the corresponding electronic device 120 may have undergone. A value associated with such an attribute may be a Boolean value or other type of value indicating the presence or absence of the event in the past at the electronic device 120.

In some example embodiments, the possible values for each attribute may depend on the nature of the attribute. For example, the value for a device type attribute may be limited to a selection among a limited number of possible device types of the electronic devices 120. In another example, the value for a particular type of operational status, such as the amount of electrical charge remaining in a battery, may be stated as a percentage ranging from zero to one hundred.

In example embodiments, the attribute value determination module 204 may access the value for each attribute of interest from each of the electronic devices 120 by polling the electronic devices 120 via the communication network 140. Also in some example embodiments, the attribute value determination module 204 may receive the attribute values from each of the electronic devices 120 from time to time, as initiated by the electronic devices 120, such as when values of one or more of the attributes change.

The filter set definition module 206, in an example embodiment, is configured to access or otherwise receive (e.g., from the client system 130 via the communication network 140 and the user interface module 202) a definition of one or more filter sets to be applied against the attribute values received from the electronic devices 120 to filter the electronic devices 120. In an example embodiment, a filter set may include one or more filters. In turn, each filter may identify an attribute, a filter value, and a relational operator relating the attribute to the filter value. For example, a filter referring to a device type may indicate that an electronic device 120 satisfies the filter if the device type of the electronic device 120 matches a specified value (e.g., "Device Type 1). In another example, a filter referring to a battery charge level may indicate that an electronic device 120 satisfies this filter if the amount of remaining charge in the battery of the electronic device is less than some specified level (e.g., ten percent). In some example embodiments, the filter set may be stored in a database, such as a relational database or any other type of data store.

In example embodiments, a filter may refer to a particular type of event that may involve one or more of the electronic devices 120 as an attribute. For example, a filter may include a filter attribute that refers to an event applicable to an electronic device 120, such as a successful upgrade of the electronic device 120 to a particular version level, an unsuccessful upgrade to a particular version level, a failure or error condition that may have occurred at the electronic device 120, and so on. Also in some example embodiments, the event-associated attribute may indicate a particular step of a multi-step upgrade sequence at which an error occurred, thus preventing the upgrade to a particular revision level. Other attributes may correspond to particular types of events involving the electronic devices 120 in other example embodiments.

These events, in some example embodiments, may be stored in an event database or data store, in which each event is logged as they occur, possibly in chronological order (e.g., as a time series) according to the point in time at which each event occurred or was reported. Some events involving an electronic device 120 may occur as the result of executing a command received from the electronic device manager 102, such as a software upgrade command, while other events (e.g., hardware failures, communication errors, etc.) may occur during the normal operation of the electronic device 120. For those events that occur in response to a command, the electronic device 120 may include information regarding the event in a status or acknowledgment response to the command that is returned to the electronic device manager 102. For those events that occur during normal operation, the electronic device 120 may push the event information to the electronic device manager 102, or the electronic device manager 102 may periodically poll the electronic device 120 to retrieve the event information. In some example embodiments, a logged event may include an identifier for the electronic device 120 affected by, or involved in, the event; an indication of the status (e.g., a current software version) of the electronic device 120 immediately after the event; and possibly an indication of the status of the electronic device 120 immediately prior to the event.

In an example embodiment, an electronic device 120 may satisfy a filter set if the electronic device 120 satisfies each individual filter of the filter set, in which the filter set represents a logical AND of the individual filters. In other example embodiments, an electronic filter may satisfy a filter set if the electronic device 120 satisfies at least one individual filter of the filter set, in which the filter set represents a logical OR of the individual filters. In other example embodiments, the filter set, as specified by the user, may explicitly define a combination of logical OR and logical AND relationships between individual filters, or groups of filters.

The device filtering module 208, in an example embodiment, may be configured to apply a particular filter set (e.g., as specified by a user of the client system 130) to the attribute values of the electronic devices 120 to identify those of the electronic devices 120 that satisfy the specified filter set, as indicated above. The device filtering module 208 may also cause the display (e.g., via the user interface module 202) of some representation of those identified electronic devices 120 (e.g., on a display device, such as a display device of the client system 130). In an example embodiment, the identified electronic devices 120 may be presented as a listing of the individual identified electronic devices 120 (e.g., a table). In another example embodiment, the identified devices 120 may be identified as one or more groups of electronic devices 120 (e.g., in a bar graph, pie chart, geographic map, or the like). Moreover, the identified groups of electronic devices 120 may be shown in some relation to the overall number of electronic devices 120 whose attribute values were compared to the filter set.

In some example embodiments, the device filtering module 208 may be configured to facilitate the saving or recording of the identities of the electronic devices 120 that satisfy a particular filter set at some particular time. For example, after identifying the electronic devices 120 that satisfy a filter set designated by the user, the device filtering module 208 may present to the user (e.g., via the user interface module 202) a selectable region or icon that, when selected by the user, causes the identities of the identified electronic devices 120 to be stored. Thereafter (e.g., hours, days, or weeks later), the user may recall the previously identified electronic devices 120, regardless of the current values of their attributes, and present them to the user. For example, the user may want to identify all electronic devices 120 that were at a previous revision level, and then filter those electronic devices 120 by a current revision level to provide a sense of how many of those electronic devices 120 were successfully upgraded.

Figure 3:
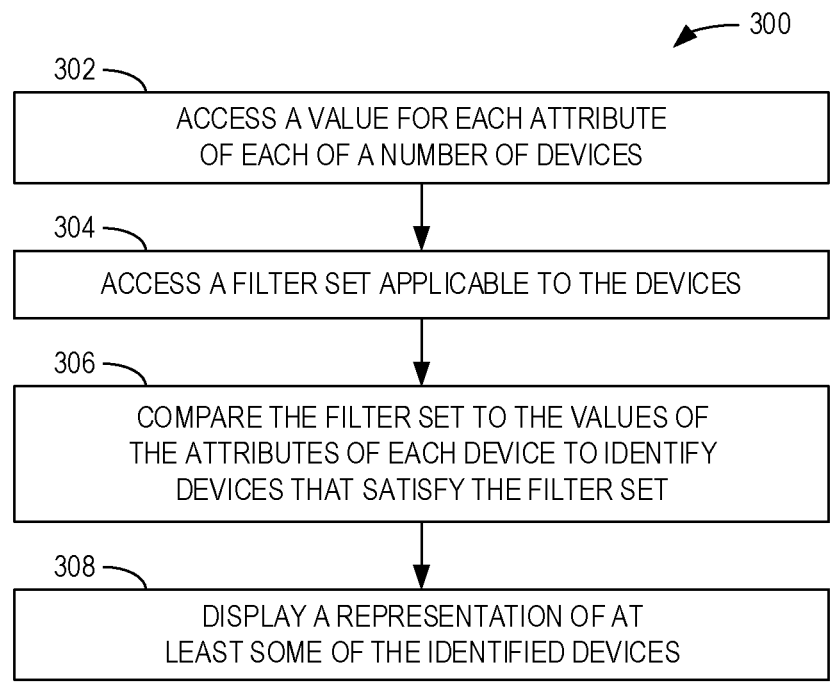
FIG. 3 is a flow diagram of an example method of filtering multiple electronic devices.

FIG. 3 is a flow diagram of an example method 300 of filtering multiple (e.g., hundreds, thousands, or millions of) electronic devices. While the method 300, as well as other methods presented herein, is described in conjunction with the electronic device manager 102, other components, devices, or systems may be utilized to perform the method 300 and others presented below in other embodiments.

In the method 300, the electronic device manager 102 (e.g., using the attribute value determination module 204) may access an attribute value for each attribute of each of a plurality of electronic devices 120 (operation 302). The electronic device manager 102 (e.g., via the filter set definition module 206) may also access a filter set applicable to the electronic devices 120 (operation 304). In an example embodiment, a user (e.g., a user employing the client system 130) may employ the user interface module 202 to select a previously defined filter set, to modify a previously defined filter set, or to generate a new filter set to be compared against the electronic devices 120.

The electronic device manager 102 (e.g., using the device filtering module 208) may compare the filter set to the attribute values of the attributes of each of the electronic devices 120 to identify those electronic devices 120 that satisfy the filter set (operation 306), and may display a representation of at least some of the identified electronic devices 120 (operation 308), as discussed above. In an example embodiment, the electronic device manager 102 may then interact with (e.g., monitor operation of, send one or more commands to, etc.) one or more of the identified electronic devices 120.

While the operations 302-308 of the method 300, as well as the operations of other methods described herein, are shown as being performed in a particular order, other orders of execution, including simultaneous, concurrent, or overlapping execution of two or more operations, are possible in other example embodiments. For example, the accessing of attribute values (operation 302) may occur somewhat asynchronously to the accessing of the filter set (operation 304), the comparing of the filter set to the attribute values (operation 306), and the displaying of the representation of at least some of the filter-satisfying electronic devices 120 (operation 308).

Figure 4:
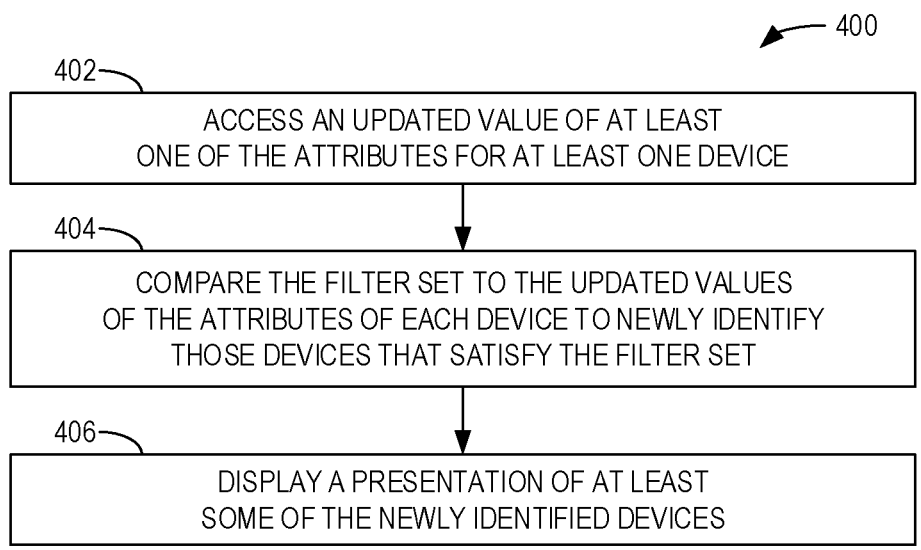
FIG. 4 is a flow diagram of an example method of employing a filter set as attribute values of one or more electronic devices are updated.

FIG. 4 is a flow diagram of an example method 400 of employing a filter set as attribute values of one or more electronic devices 120 are updated. In the method 400, the electronic device manager 102 (e.g., using the attribute value determination module 204) may access an updated value of at least one of the attributes for at least one of the electronic devices (operation 402). The electronic device manager 102 (e.g., via the device filtering module 208) may then compare the filter set to the attribute values (including the one or more updated attribute values) to identify anew those electronic devices 120 that satisfy the filter set (operation 404), and may display a representation of at least some of the newly identified electronic devices 120 (operation 406). In some example embodiments, the comparing of the filter set to the updated attribute values (operation 404) and the display of the presentation of at least some of the newly identified electronic devices 120 (operation 406) may occur in response to the updated attribute values being access or received. Moreover, the accessing of the updated attribute values may occur in near-real-time, possibly resulting in a presentation of the identified electronic devices 120 changing over time in response to changes in the attribute values, thus providing the user a near-real-time dynamic display of the electronic devices 120 that satisfy the filter set. For example, as new electronic devices 120 become available, or as the attribute values of previous electronic devices 120 change over time, the display representing the filter-satisfying electronic devices 120 may change over time in accordance with the change in attribute values.

In some example embodiments, the received attributes may include attributes referring to particular events involving the electronic devices 120. Consequently, as events occur at the various electronic devices 120 and are reported and logged in an event database or data store, as described above, one or more of the attributes involved in the current filter set for some of the electronic devices 120 may change. As a result, some electronic devices 120 that previously failed to satisfy the current filter set may now satisfy that set, while other electronic devices 120 that previously satisfied the filter set may now fail to do so. In some example embodiments, the electronic device manager 102, via the user interface module 202, may add and remove a representation of the various electronic devices 120 from display to the user as they satisfy, or fail to satisfy, the current filter set in near real-time.

In yet other example embodiments, the electronic device manager 102, via the user interface module 202, may maintain a representation of all electronic devices 120 that initially satisfied a current filter set at a particular point in time, and then provide a way of distinguishing the representation of those electronic device 120 that fail to continue to satisfy the current filter set due to one or more of the logged events. Moreover, the user interface module 202 may provide a representation of those electronic devices 120 that, due to one or more events, acquired a state after the particular point in time that satisfies the current filter set. In some example embodiments, the user interface module 202 may distinguish between these various groups of electronic devices 120 by way of icons, colors, display areas, or other visually distinguishable features of the user interface by which the electronic devices 120 are presented. In addition, various aspects of the display, such as the particular point in time at which the current filter set is first applied to attributes of the electronic devices 120, may be set by a user of the electronic device manager 102 via the client system 130.

FIGS. 5A through 5K are graphical depictions of a user interface presented to a user (e.g., via the user interface module 202 and the client system 130) to filter multiple electronic devices 120. More specifically, FIGS. 5A through 5K depict a sequence of individual views 500A through 500K of a graphical user interface that may be displayed to a user of the client system 130 as the user interacts with the electronic device manager 102 to monitor and control any number of electronic devices 120, as well as perform other operations associated with the cloud system 101.

As seen in a first view 500A of the user interface, the user may select one of a number of user interface panels through which the user may interact with the electronic devices 120, such as a "Device Manager" panel (e.g., a panel through which the user may monitor and control various aspects of the electronic devices 120), a "Repository Panel" (e.g., a panel by which the user may access repositories of software that may be deployed to one or more of the electronic devices 120), an "Analytics" panel (e.g., a panel through which the user may review and analyze data (e.g., sensor data) from one or more of the electronic devices 120), a "Connectivity" panel (e.g., a panel through which the connectivity of each of the electronic devices 120 to the cloud system 101 via the communication network 140 may be monitored), and so on.

Figure 5A:
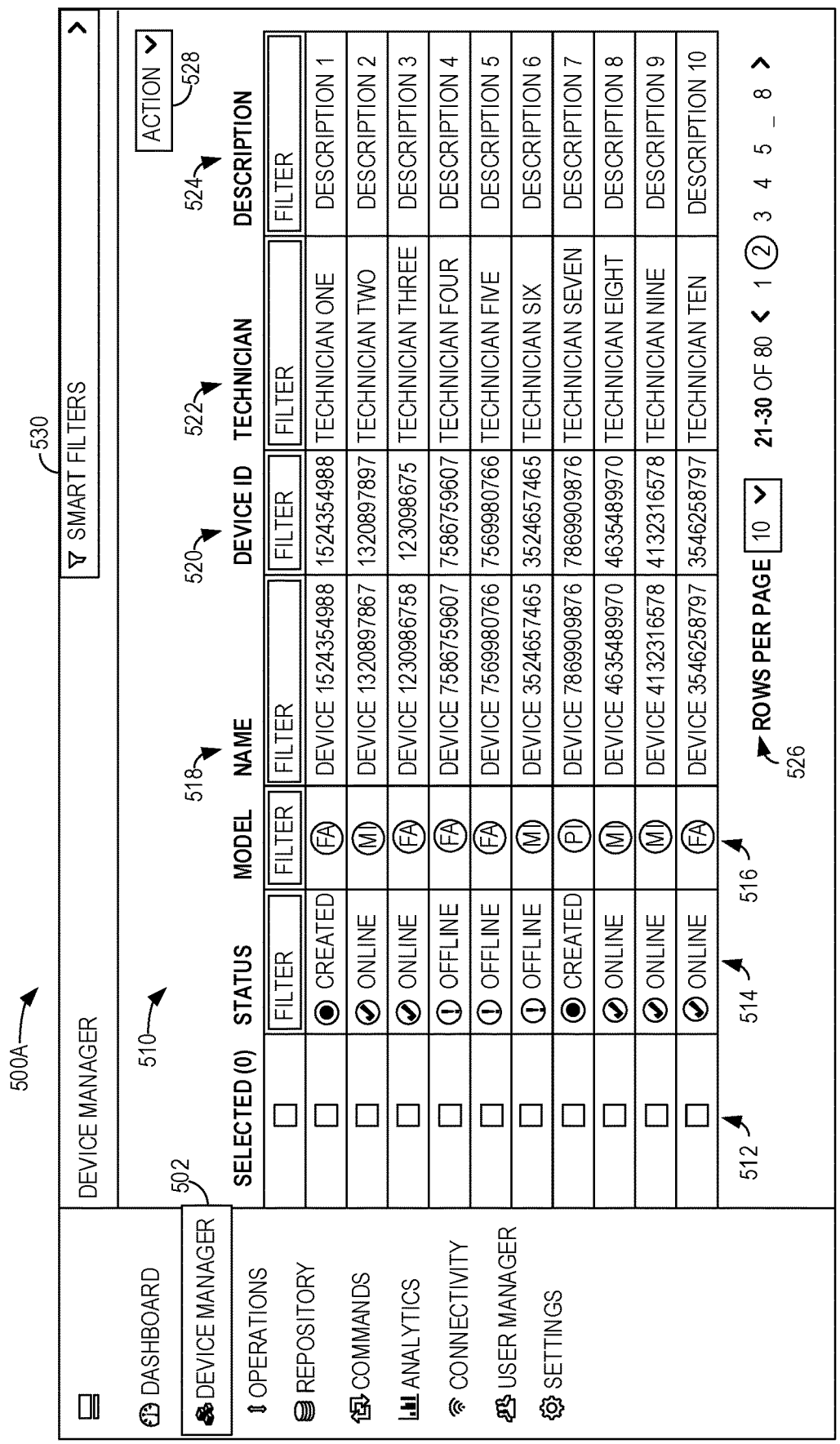

As illustrated in a user interface view 500A of FIG. 5A, the user has selected the Device Manager panel 502 from a list of the possible panels along the left-hand side of the view 500A. In response, a portion of all of the electronic devices 120 associated with that user are presented for display in a table 510. In this example embodiment, each row of the table 510 presents information about a particular electronic device 120 over multiple columns, such as an operational status 514 of the electronic device 120 (e.g., created, offline, online, and so on), a model 516 or type of the electronic device 120 (e.g., field agent (FA), mini field agent (MI), Raspberry Pi® agent (PI), and so forth), a device name 518, a device identifier 520, a technician 522 tasked with overseeing the electronic device 120, a description 524 of the use of the particular electronic device 120, and so on. In example embodiments, the user interface view 500A may display a "selected" column 512 to enable user selection of individual electronic devices 120 to which a particular action may be directed. In this example embodiment, the particular action to be directed to the selected electronic devices 120 (e.g., upgrading of the software deployed on the electronic device 120, placing the electronic device 120 in an online or offline state, etc.) may be selected via an "action" dropdown menu 528.

In the example embodiment of FIG. 5A, the user interface view 500A includes a summary area 526 describing the overall display of the electronic devices 120. As indicated in this example, eighty total electronic devices 120 are displayed as eight pages of ten electronic devices 120 each, with the second page currently being displayed. Consequently, a direct comparison between particular electronic devices 120 of interest to the user may be difficult, especially if those electronic devices 120 are distributed across several different pages. The situation is exacerbated greatly if the total number of electronic devices 120 displayed number in the hundreds, thousands, or millions.

Figure 5B:
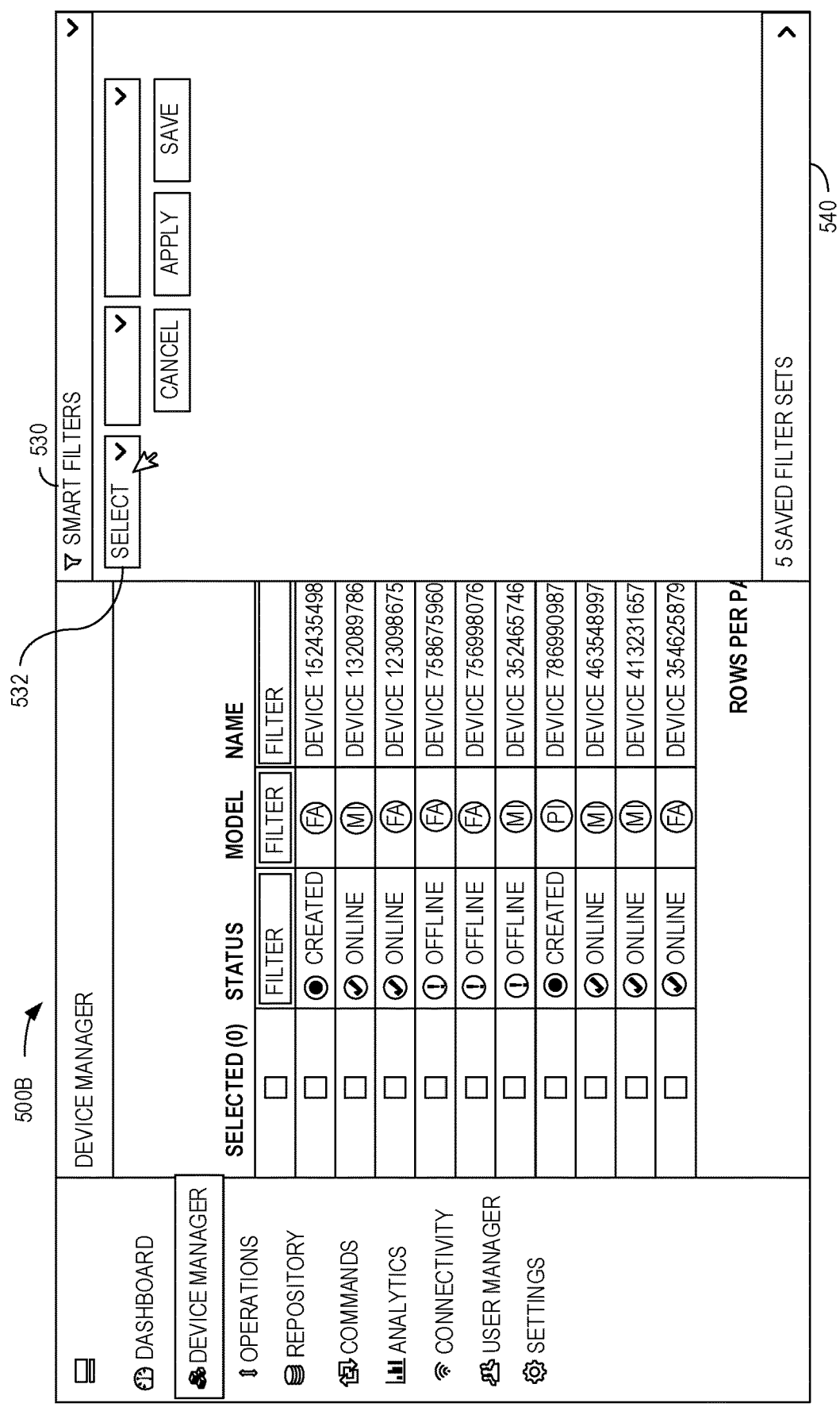

To help focus the attention of the user on only those electronic devices 120 current of interest to the user, the user interface view 500A provides a selectable "smart filters" area 530 that, when selected by the user, may produce the user interface view 500B of FIG. 5B, in which is presented an interface section for facilitating user definition and selection of one or more filter sets, as mentioned above. The interface section may include a selectable attribute dropdown menu 532 to select an attribute for a filter. In addition, the section may include a selectable "saved filter sets" label 540 allowing a user to access previously saved filter sets, as is described in greater detail below. In an example embodiment, the attributes listed in the selectable attribute dropdown menu 532 are based on the attributes associated with the electronic devices 120. Consequently, the filter set definition module 206 may determine the electronic devices 120, determine the plurality of attributes associated with the electronic devices 120, and cause those attributes to be presented in the selectable attribute dropdown menu 532.

Figure 5C:
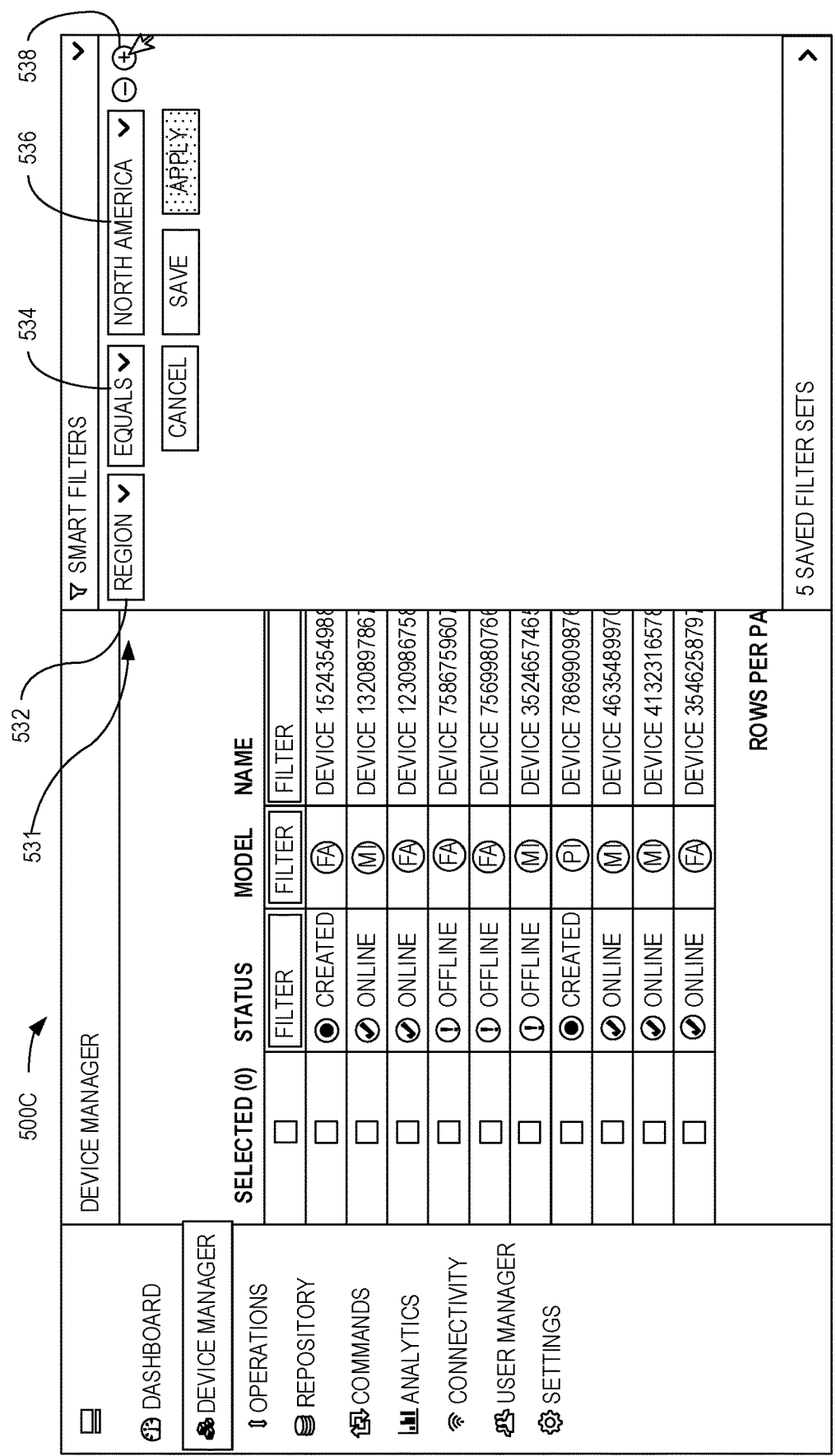

In response to the user selecting an attribute in the attribute dropdown menu 532, the user interface module 202 may present associated filter value and relational operation dropdown menus to facilitate user selection of the filter value and relational operator corresponding to the selected attribute, resulting in a defined filter. FIG. 5C depicts a user interface view 500C after the user has selected the "region" attribute via the attribute dropdown menu 532, an "equals" relational operator from a relational operator dropdown menu 534, and a "North America" filter value from a filter value dropdown menu 536. These selections result in a filter by which those electronic devices 120 located in the geographic region of North America will satisfy the defined filter. In at least some example embodiments, the selectable choices in the relational operator dropdown menu 534 and/or the filter value dropdown menu 536 are predicated on the particular user selection of the attribute from the attribute dropdown menu 532. In some example embodiments, fields in which the user may enter characters to specify a particular filter value or relational operator may be presented in lieu of a dropdown menu. The user may then activate an "add filter" button 538, as illustrated in FIG. 5C, to add the filter to the current filter set.

Figure 5D:
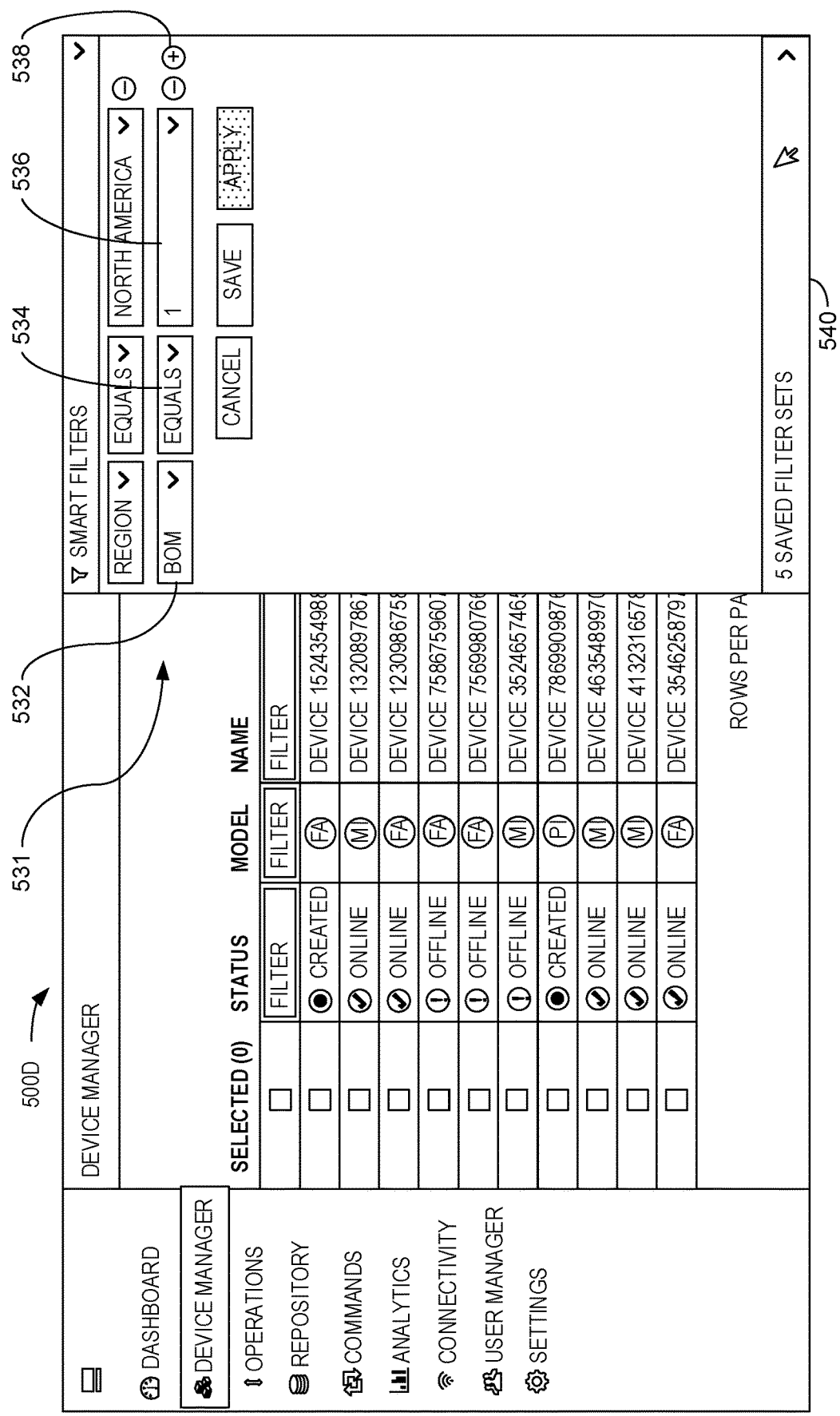
Figure 5G:
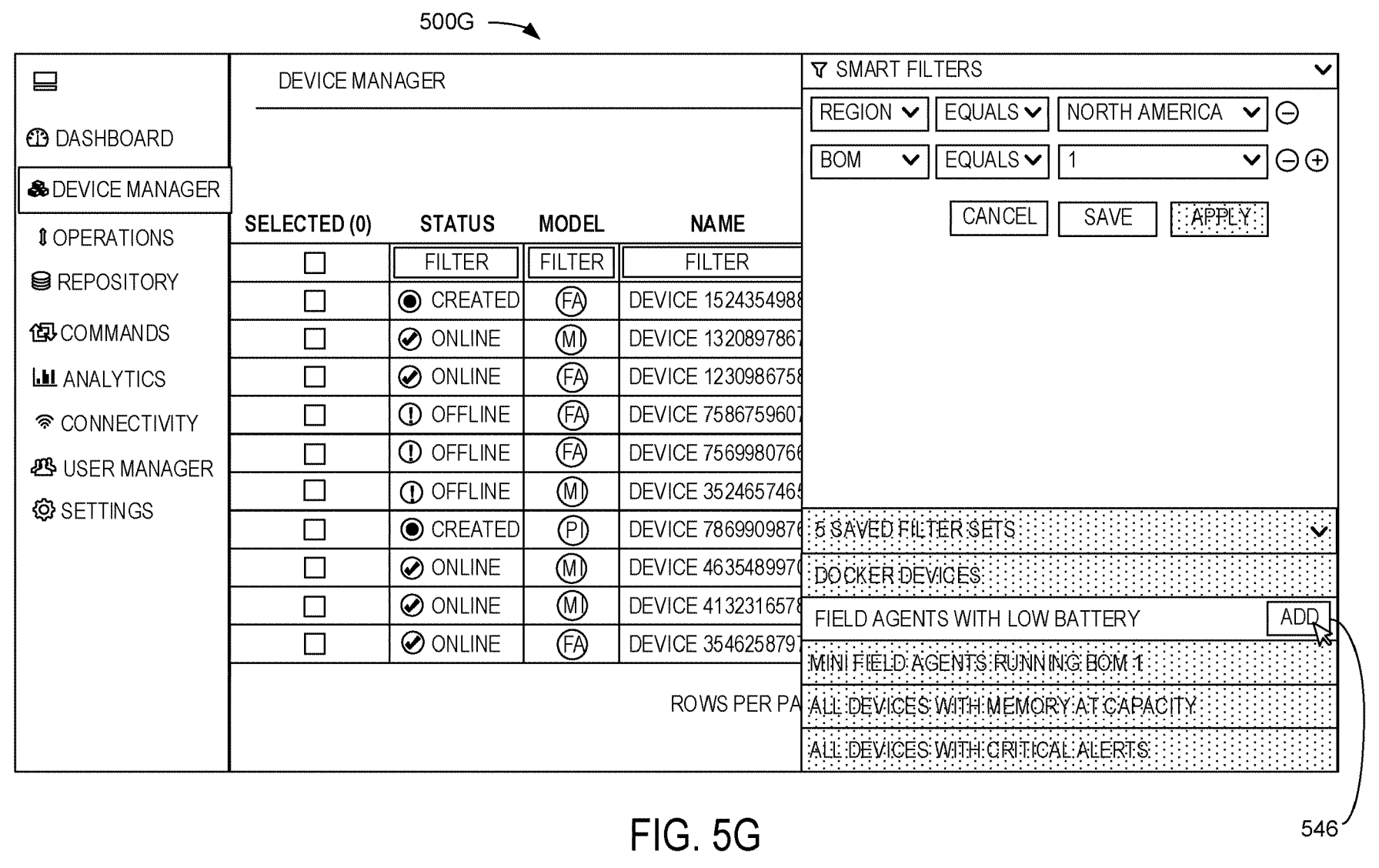
Figure 5H:
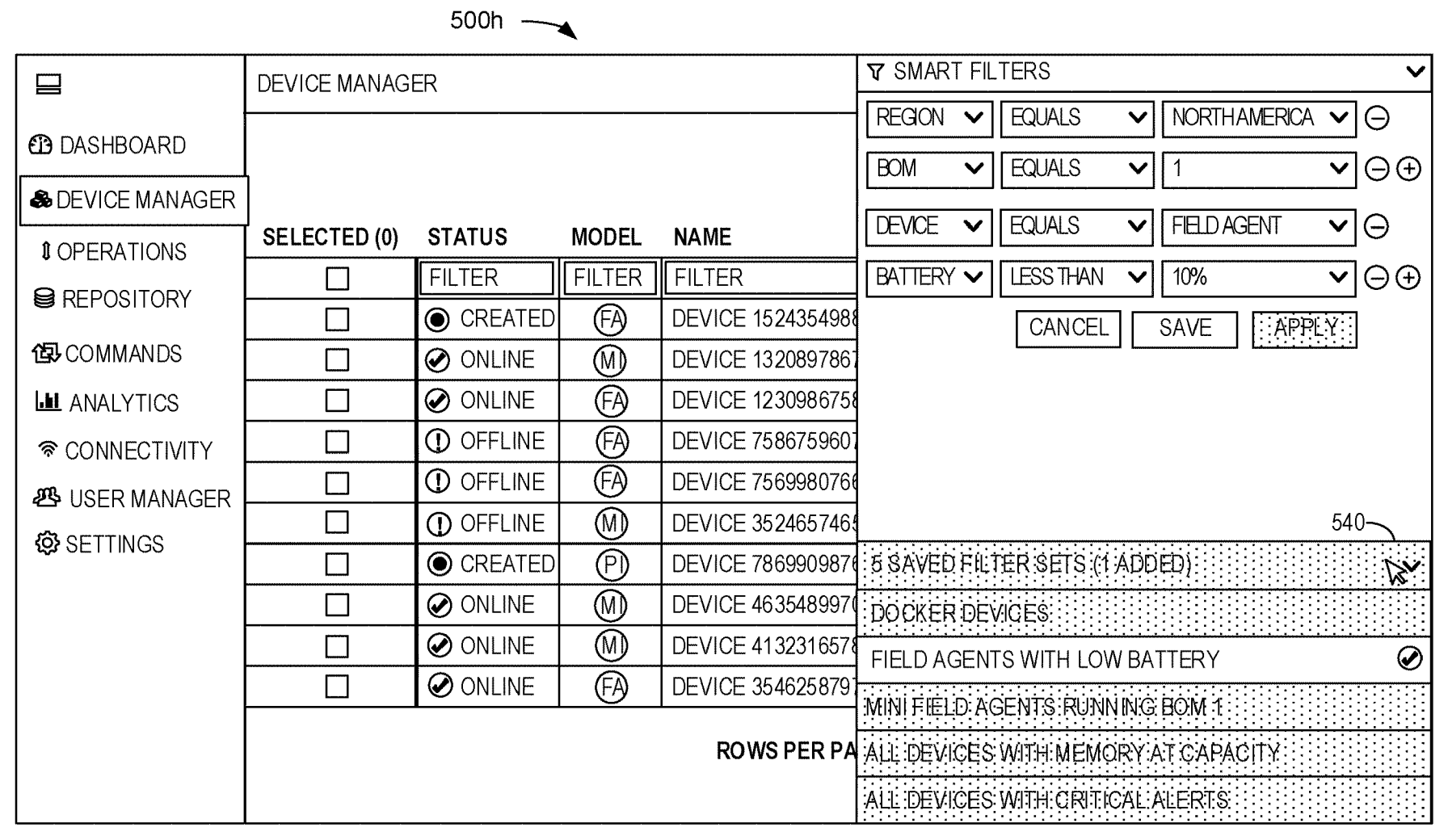
Figure 5I:
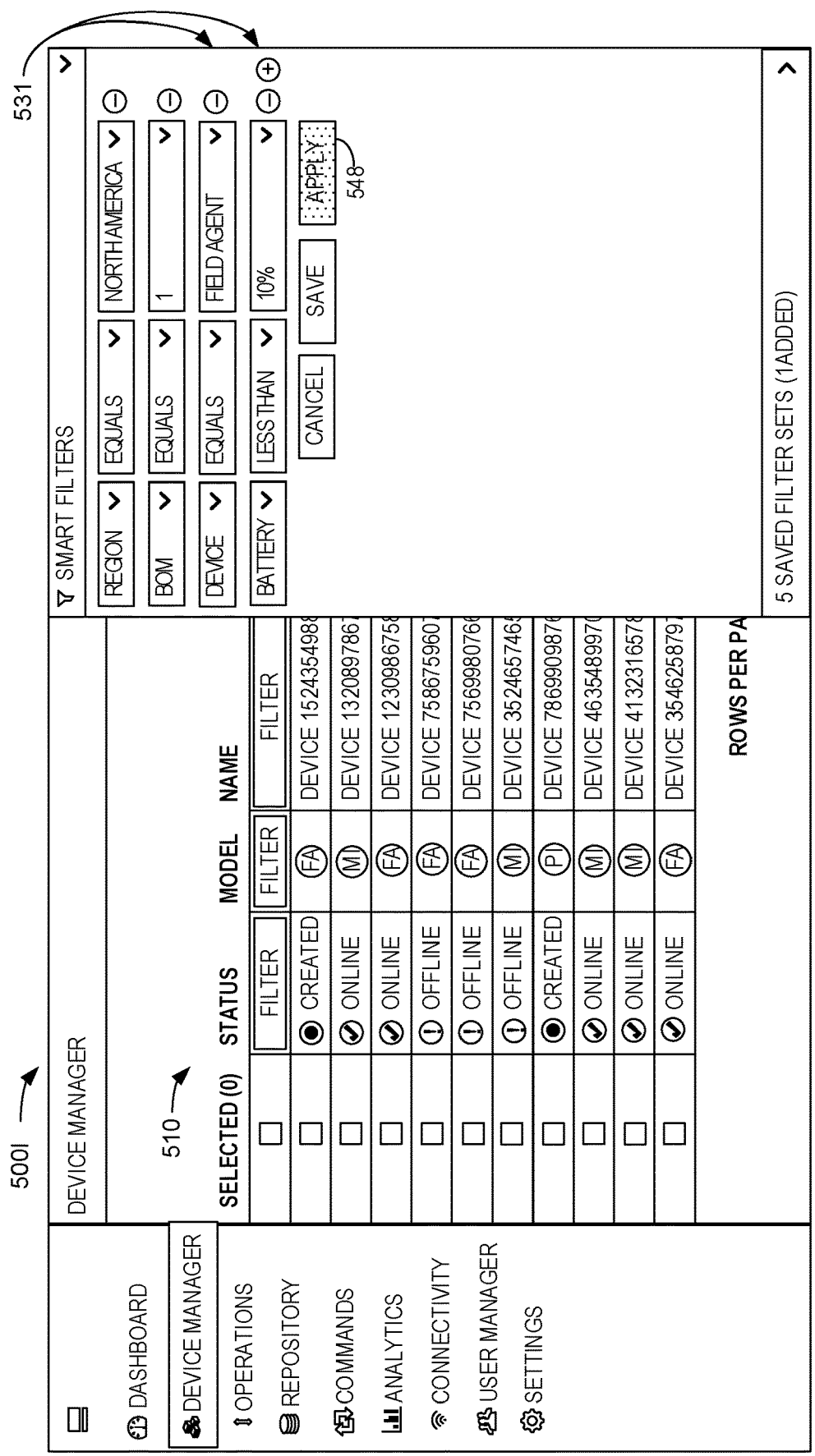

FIG. 5D depicts a user interface view 500D in which the user has added a second filter via another attribute dropdown menu 532, relational operator dropdown menu 534, and filter value dropdown menu 536 that selects electronic devices 120 that are currently at a version level (e.g., a "Bill of Materials," or BOM) of "1". This second filter may then be added to the current filter set by way of user selection of the add filter button 538. In this particular example embodiment, a BOM represents a set of separate software components (e.g., a developer's kit, firmware, software, and so on) deployed on the electronic device 120.

In some example embodiments, the attribute dropdown menu 532 may include attributes regarding events that may have involved one or more of the electronic devices 120, such as a particular error condition, an upgrade to or from a particular software revision level, and so on. For example, in response to a user selection of a "previous error condition" attribute from the attribute dropdown menu 532, the user interface module 202 may provide a list of potential error conditions via the filter value dropdown menu 536. In another example embodiment, in response to a user selection of a "previous attempted BOM upgrade" attribute from the attribute dropdown menu 532, the user interface module 202 may provide a list of potential BOMs to which an electronic device 120 was previously targeted for an upgrade via the filter value dropdown menu 536. Such event-based attributes may be accessed by way of a search of events logged in an event database or data store, as described above.

As further shown in FIG. 5D, the user may then select the saved filter sets label 540, resulting in the user interface view 500E of FIG. 5E. Therein, a filter set list 542 of five filter sets previously defined by the user is displayed. In this example embodiment, the user selects the filter set titled "Field Agents with low battery," resulting in the user interface view 500F of FIG. 5F, in which the selected filter set 544 is highlighted, and includes the presentation of a filter set "add" button 546. In response to the user selecting the filter set add button 546, as illustrated in the user interface view 500G of FIG. 5G, filters of the selected filter set 544 are added to the current filter set, as depicted in the user interface view 500H of FIG. 5H. Also in response to that selection, the saved filter sets label 540 indicates that a new filter set is being added. The user may then activate the saved filter sets label 540 again, resulting in a minimization of the saved filter set list 542 and renewed access to the individual filters, as shown in the user interface view 500I of FIG. 5I. As shown therein, the two filters 531 of the selected filter set ("Field Agents with low battery"), respectively indicating a device type of "Field Agent" and a battery charge level of less than ten percent, are added to the current filter set.

Figure 5J:
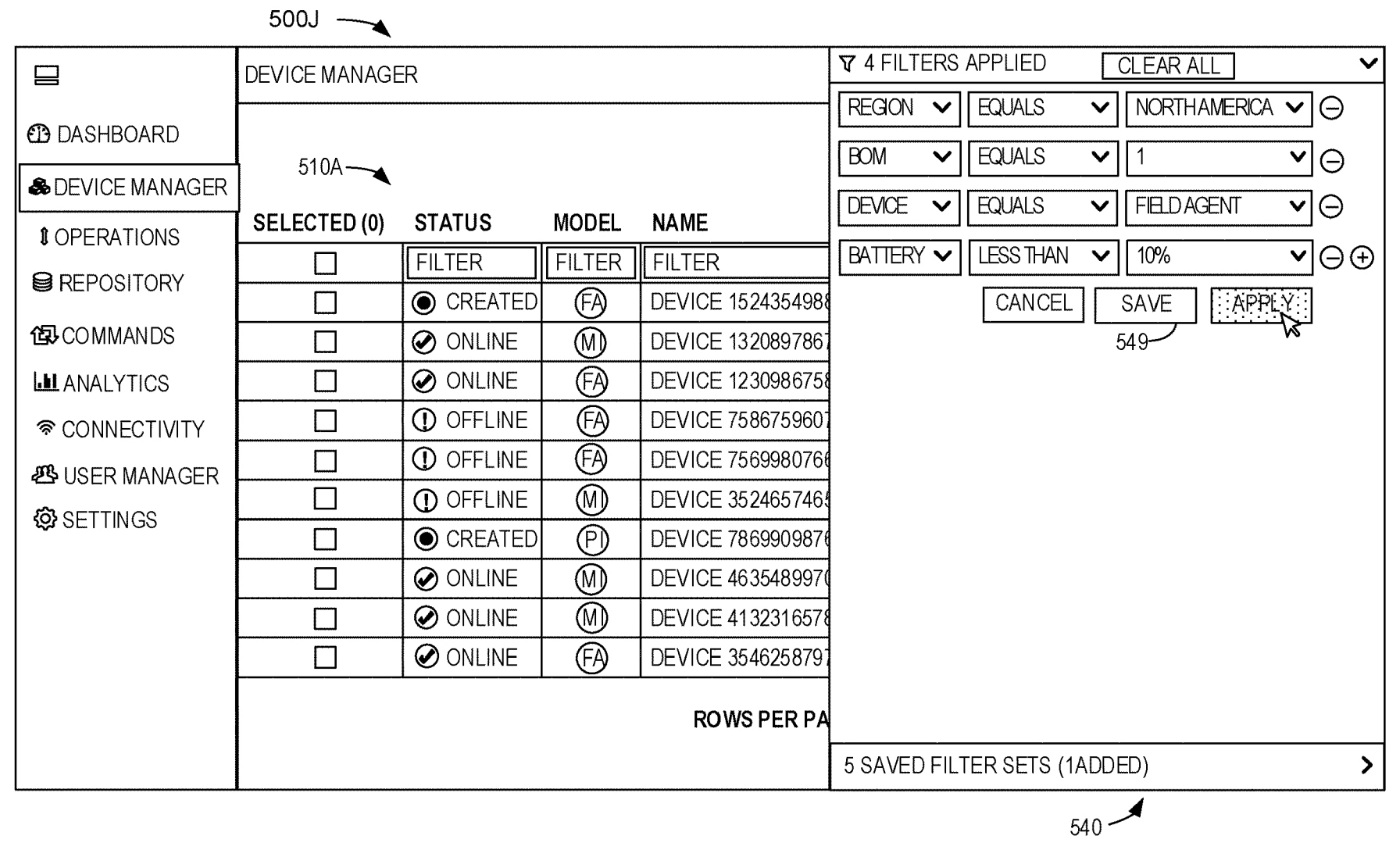
Figure 5K:
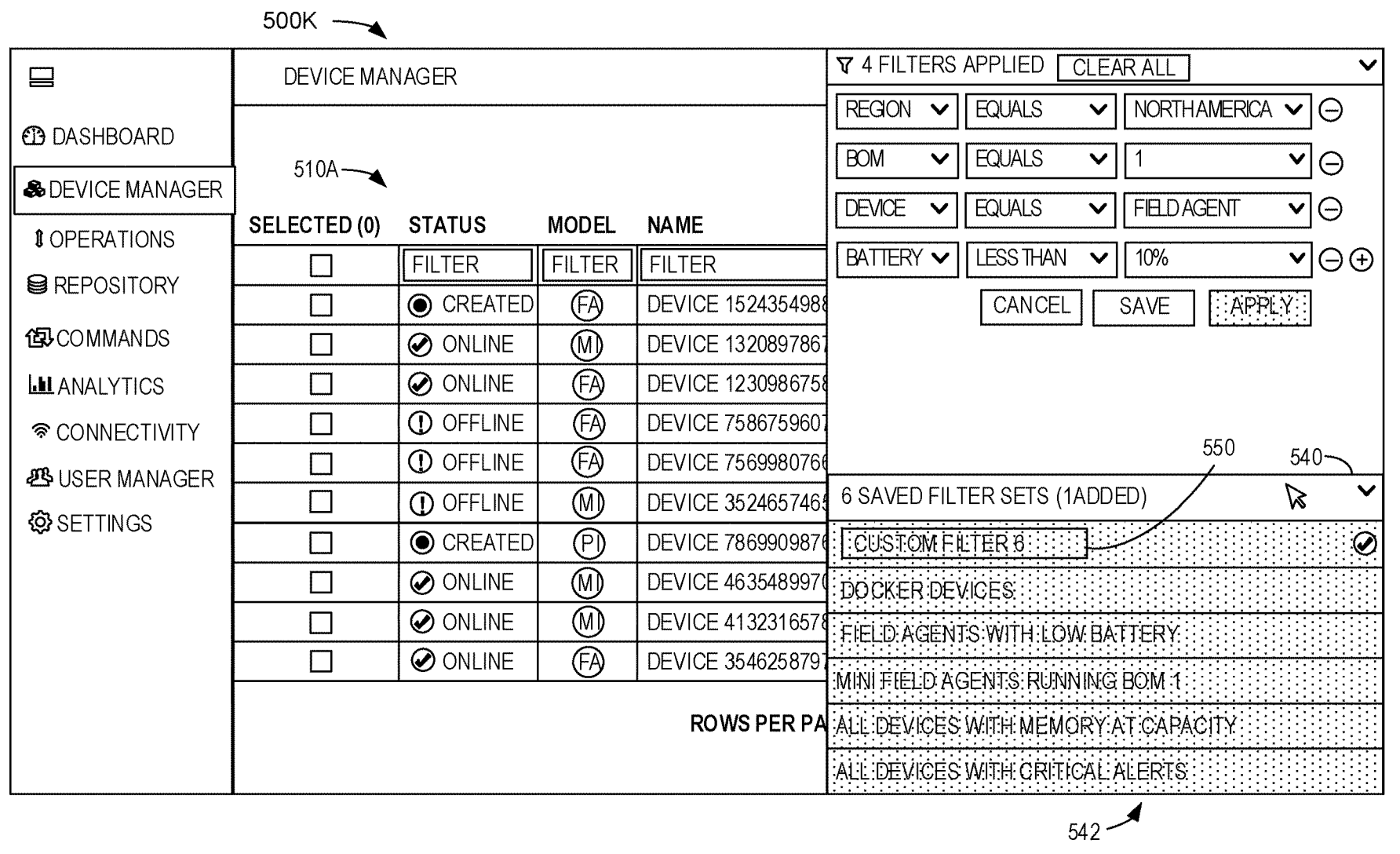

At this point, the current filter set has not been applied to the electronic devices 120 listed in the table 510. However, in response to the user activating an "apply" button 548, the current filter set that now includes the four filters described above is applied to the table 510, resulting in the reduced table 510A of the user interface view 500J of FIG. 5J, depicting only six of the original eighty electronic devices 120 that satisfy the filter set (e.g., those electronic devices 120 in North America that are Field Agents at a BOM level of one with a battery charge level of less than ten percent). To save the current filter set for later user, the user may activate a "save" button 549, resulting in the current filter set being saved as a new filter set entry in the filter set list 542, as displayed in the user interface view 500K of FIG. 5K. In addition, the new filter set entry may provide a filter set name field 550, prepopulated with a default field name ("Customer Filter 6") that may be modified by the user with a more descriptive title.

As mentioned above, the electronic devices 120 satisfying the currently applied filter set may not be listed in a table (e.g., reduced table 510A). In some example embodiments, the identified electronic devices 120 may be referred to in a map, bar graph, pie chart, or other form of information. In addition, the identified electronic devices 120 may be grouped according to other attribute values not explicitly specified by the user, such as different stages of an upgrade process at which various electronic devices 120 failed or encountered an error or warning condition. Moreover, one or more areas of such an interface view corresponding to the various groups of identified electronic devices 120 may be selectable, resulting in a further filtering of the electronics devices 120 based on the selected area. For example, a map that indicates various regions within North America in which groups of the identified electronic devices 120 are displayed may have selectable areas for each region that, when selected, result in a presentation of the electronic devices 120 located in that region. Also in an example embodiment, the identified electronic devices 120 may be shown in some relation (e.g., a percentage) of the total number of electronic devices 120. In some example embodiment, presenting the electronic devices 120 that satisfy a filter set in a map, bar graph, or other form of information may be more easily discerned by a user than in a table format, especially when the number of electronic devices 120 involved is in the thousands or millions.

In some example embodiments, the user may then interact with the same six identified electronic devices 120 shown in reduced table 510A when selecting another interface panel along the left-hand side of the display. For example, if the user selected the Connectivity panel, the user may then view information regarding the network connectivity of the six identified electronic devices 120. Similarly, the user may select the Analytics panel, which may result in a user interface view through which the user may apply one or more data processing algorithms to sensor data specifically received from the six electronic devices 120. In such example embodiments, the currently employed filter set is "global" in scope since the same identified electronic devices 120 satisfying the filter set may be accessed, controlled, or monitored using any of the available interface panels. In some example embodiments, one or more of the various interface panels may provide access to functionality provided by various developers, such as a customer owning or managing the electronic devices 120, or third-party developers.

Also in some example embodiments, the Device Manager panel may provide a "snapshot" button (not depicted in FIGS. 5A through 5K) that, when selected by the user, results in the identity of the six electronic devices 120 being saved for future use. For example, at some later time, instead of the user applying the same filter set described above, the user may activate an "apply snapshot" button (also not depicted in FIGS. 5A through 5K) that results in a presentation of the same six electronic devices 120 and their current associated information regardless of whether those electronic devices 120 would currently satisfy the same filter set.

In an example embodiment, a method for filtering devices comprises accessing a value for each of a plurality of attributes for each of a plurality of devices; accessing a filter set comprising one or more filters from a database using at least one hardware processor, wherein each of the one or more filters comprises one of the plurality of attributes, a filter value, and a relational operator relating the one of the plurality of attributes to the filter value, the attribute of at least one of the filters indicating an event applicable to individual ones of the plurality of devices, the filter value of the at least one of the filters indicating whether to filter the plurality of devices based on the presence or absence of a previous occurrence of the event; comparing the filter set to the values of the plurality of attributes of each of the plurality of devices using the at least one hardware processor to identify those of the plurality of devices that satisfy all of the one or more filters of the filter set; and causing display of a representation of at least some of the identified devices on a display device.

In another example embodiment, including all previous example embodiments, the event comprises an upgrade of at least one of the plurality of devices from a first version to a second version.

In another example embodiment, including all previous example embodiments, the upgrade of the at least one of the plurality of devices comprises a plurality of operations applied in a sequence to the at least one of the plurality of devices.

In another example embodiment, including all previous example embodiments, the value associated with the event represents a most recent of the plurality of operations applied to the at least one of the plurality of devices.

In another example embodiment, including all previous example embodiments, the plurality of attributes comprise a geographic location.

In another example embodiment, including all previous example embodiments, the plurality of attributes comprise a version level.

In another example embodiment, including all previous example embodiments, the plurality of attributes comprise a current operational status.

In another example embodiment, including all previous example embodiments, the method further comprises accessing an updated value of at least one of the plurality of attributes for at least one of the plurality of devices during the display of the representation of the at least some of the identified devices; comparing the filter set to the updated value of the at least one of the plurality of attributes for the at least one of the plurality of devices to newly identify those of the plurality of devices that satisfy all of the one or more filters of the filter set; and causing display of a representation of at least some of the identified devices on a display device.

In another example embodiment, including all previous example embodiments, the representation of at least some of the identified devices comprises a first representation of at least some of the identified devices; the first representation of at least some of the identified devices is displayed in a first user interface configured to initiate a first set of operations corresponding to the identified devices; and the method further comprises receiving a user input to switch from the first user interface to a second user interface configured to initiate a second set of operations corresponding to the identified devices; and causing display of the second user interface in response to the user input, the second user interface including a second representation of the at least some of the identified devices.

In another example embodiment, including all previous example embodiments, the first set of operations comprises upgrading the identified devices to a current version level.

In another example embodiment, including all previous example embodiments, the second set of operations comprises accessing analytical information generated by the identified devices.

In another example embodiment, including all previous example embodiments, the second set of operations comprises determining a connectivity of the identified devices to a communication network.

In another example embodiment, including all previous example embodiments, the method further comprises identifying the plurality of devices; determining the plurality of attributes based on the identifying of the plurality of devices; causing presentation of the plurality of attributes as first available user selections; and receiving a user selection of each of the one or more filters of the filter set via the first available user selections.

In another example embodiment, including all previous example embodiments, the method further comprises causing presentation of second available user selections in response to receiving the user selection of one of the one or more filters; and receiving a user selection of the filter value for the one of the one or more filters via the second available user selections.

In another example embodiment, including all previous example embodiments, the representation of at least some of the identified devices comprises a table of the at least some of the identified devices, the table comprising the value of at least one of the plurality of attributes for each of the at least some of the identified devices.

In another example embodiment, including all previous example embodiments, the representation of at least some of the identified devices comprises a map indicating geographical locations of the at least some of the identified devices.

In another example embodiment, including all previous example embodiments, the representation of at least some of the identified devices comprises a graphical representation indicating a percentage of the identified devices relative to the plurality of devices.

In another example embodiment, including all previous example embodiments, the representation of at least some of the identified devices comprises a first representation; and the method further comprises receiving a first user input during the display of the representation of the at least some of the identified devices; storing identifiers for the identified devices; receiving a second user input after the storing of the identifiers for the identified devices; and causing display of a second representation of the at least some of the identified devices in response to receiving the second input, the second representation comprising an indication of a current status of the at least some of the identified devices.

In an example embodiment, a system comprises one or more hardware processors; and a memory storing instructions that, when executed by at least one of the one or more hardware processors, cause the system to perform operations comprising accessing a value for each of a plurality of attributes for each of a plurality of devices; accessing a filter set comprising one or more filters from a database, wherein each of the one or more filters comprises one of the plurality of attributes, a filter value, and a relational operator relating the one of the plurality of attributes to the filter value, the attribute of at least one of the filters indicating an event applicable to individual ones of the plurality of devices, the filter value of the at least one of the filters indicating whether to filter the plurality of devices based on the presence or absence of a previous occurrence of the event; comparing the filter set to the values of the plurality of attributes of each of the plurality of devices to identify those of the plurality of devices that satisfy all of the one or more filters of the filter set; and causing display of a representation of at least some of the identified devices on a display device.

In an example embodiment, a non-transitory computer-readable storage medium stores instructions that, when executed by at least one hardware processor of a machine, cause the machine to perform operations comprising accessing a value for each of a plurality of attributes for each of a plurality of devices; accessing a filter set comprising one or more filters from a database, wherein each of the one or more filters comprises one of the plurality of attributes, a filter value, and a relational operator relating the one of the plurality of attributes to the filter value, the attribute of at least one of the filters indicating an event applicable to individual ones of the plurality of devices, the filter value of the at least one of the filters indicating whether to filter the plurality of devices based on the presence or absence of a previous occurrence of the event; comparing the filter set to the values of the plurality of attributes of each of the plurality of devices to identify those of the plurality of devices that satisfy all of the one or more filters of the filter set; and causing display of a representation of at least some of the identified devices on a display device.

Figure 6:
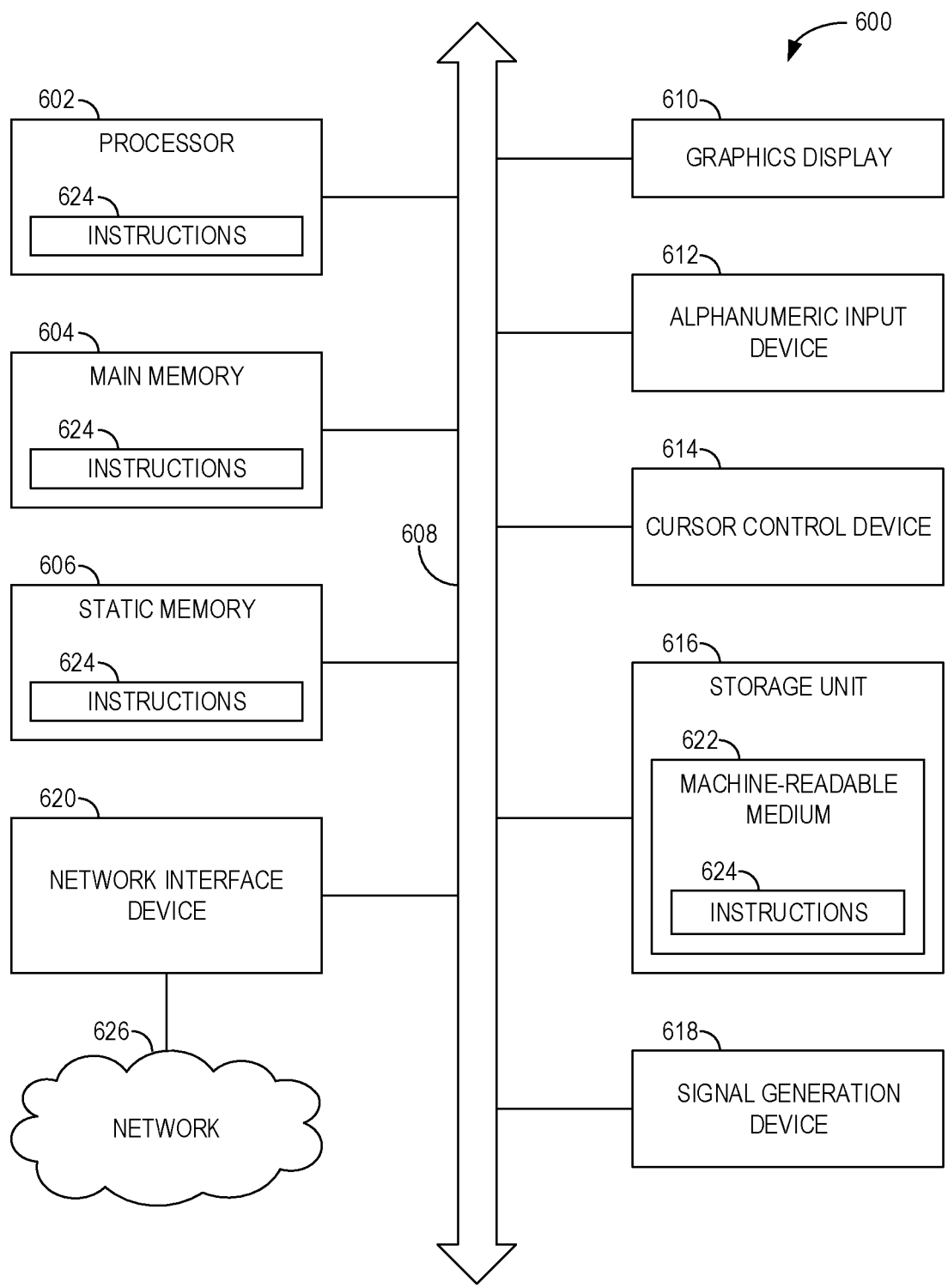
FIG. 6 is a block diagram of a machine or device in the example form of a computer system within which instructions for causing the machine or device to perform any one or more of the methodologies discussed herein may be executed.

FIG. 6 is a block diagram illustrating components of a machine 600, according to some example embodiments, able to read instructions 624 from a machine-readable medium 622 (e.g., a non-transitory machine-readable medium, a machine-readable storage medium, or a computer-readable storage medium) and perform any one or more of the methodologies discussed herein, in whole or in part. Specifically, FIG. 6 depicts the machine 600 in the example form of a computer device (e.g., a computer) within which the instructions 624 (e.g., software, firmware, a program, an application, an applet, an app, or other executable code) for causing the machine 600 to perform any one or more of the methodologies discussed herein, in whole or in part.

For example, the instructions 624 may cause the machine 600 to execute the methods 300, 400 of the flow diagrams of FIGS. 3 and 4, as well as all example embodiments associated therewith. The instructions 624 can transform the general, non-programmed machine 600 into a particular machine (e.g., specially configured machine) programmed to carry out the described and illustrated functions in the manner described. Also, in example embodiments, the machine 600 may operate as one or more of the modules or components of the cloud system 101 of FIG. 1 (including the electronic device manager 102), or any other computing system or device described herein.

In example embodiments, the machine 600 operates as a standalone device or may be connected (e.g., networked) to other machines. The machine 600 may be a server computer, an IIoT gateway, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, a power adapter, or any machine 600 capable of executing the instructions 624, sequentially or otherwise, that specify actions to be taken by that machine 600. Further, while only a single machine 600 is illustrated, the term "machine" shall also be taken to include a collection of machines 600 that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light-emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a cursor control device 614 (e.g., a mouse, a touchpad, a trackball, a joystick, a motion sensor, an eye tracking device, or other pointing instrument), a storage unit 616, a signal generation device 618 (e.g., a sound card, an amplifier, a speaker, a headphone jack, or any suitable combination thereof), and a network interface device 620.

The storage unit 616 includes the machine-readable medium 622 (e.g., a tangible machine-readable storage medium) on which is stored the instructions 624 embodying any one or more of the methodologies or functions described herein. The instructions 624 may also reside, completely or at least partially, within the main memory 604, within the processor 602 (e.g., within a cache memory of the processor 602), or both, before or during execution thereof by the machine 600. Accordingly, the main memory 604 and the processor 602 may be considered machine-readable media 622 (e.g., tangible and non-transitory machine-readable media).

In some example embodiments, the machine 600 may be a portable or mobile computing device and have one or more additional input components (e.g., sensors or gauges). Examples of such input components include an image input component (e.g., one or more cameras), an audio input component (e.g., a microphone), a direction input component (e.g., a compass), a location input component (e.g., a Global Positioning System (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 622 able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions 624. The term "machine-readable medium" shall also be taken to include any medium, or combination of multiple media, that is capable of storing instructions 624 for execution by a machine (e.g., machine 600), such that the instructions 624, when executed by one or more processors of the machine 600 (e.g., processor 602), cause the machine 600 to perform any one or more of the methodologies described herein. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 622 is non-transitory in that it does not embody a propagating or transitory signal. However, labeling the machine-readable medium 622 as "non-transitory" should not be construed to mean that the medium is incapable of movement; the medium should be considered as being transportable from one physical location to another in some example embodiments. Additionally, since the machine-readable medium 622 is tangible, the medium may be considered a machine-readable device.

The instructions 624 may further be transmitted or received over a communications network 626 using a transmission medium via the network interface device 620 and utilizing any one of a number of well-known transfer protocols (e.g., Hypertext Transfer Protocol (HTTP)). Examples of communication networks 626 include a local area network (LAN), a wide area network (WAN), the Internet, mobile telephone networks, plain old telephone service (POTS) networks, and wireless data networks (e.g., Wi-Fi®, LTE®, and WiMAX™ networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain example embodiments are described herein as including logic or a number of components, modules, or mechanisms. Modules may constitute either software modules (e.g., code embodied on a machine-readable medium 622 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 602 or a group of processors 602) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering example embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these example embodiments without departing from the broader scope of embodiments of the present disclosure. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single inventive concept if more than one is, in fact, disclosed.

The example embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for filtering devices, the method comprising:
deploying a plurality of devices, the devices being internet-of-things (IoT) devices operating and disposed in an industrial environment;
accessing a value for each of a plurality of attributes for each of the plurality of devices;
accessing a filter set comprising one or more filters from a database using at least one hardware processor, wherein each of the one or more filters comprises one of the plurality of attributes, a filter value, and a relational operator relating the one of the plurality of attributes to the filter value, the attribute of at least one of the filters indicating an event applicable to individual ones of the plurality of devices, the filter value of the at least one of the filters indicating whether to filter the plurality of devices based on the presence or absence of a previous occurrence of the event;
comparing the filter set to the values of the plurality of attributes of each of the plurality of devices using the at least one hardware processor to identify those of the plurality of devices that satisfy all of the one or more filters of the filter set; and
when a selected first one of the plurality of devices satisfy all of the one or more filters of the filter set, causing display of a representation of at least some of the identified devices on a display device;
when a selected second one of the plurality of devices satisfy all of the one or more filters of the filter set, causing the sending of commands to one or more of the plurality of devices;
when a selected third one of the plurality of devices satisfy all of the one or more filters of the filter set, monitoring the operation of one or more of the plurality of devices;
wherein the attributes change over time based upon events that occur at the plurality of electronic devices and the events include an upgrade of at least one of the plurality of devices from a first version to a second version such that a fourth one of the plurality of devices satisfies all of the one or more filters of the filter set at a first time and fails to satisfy one or more filters of the filter set at a second time, and wherein a display showing the fourth one of the plurality of devices changes from the first time to the second time in accordance with changes in attribute values at the fourth device.

2. The method of claim 1, wherein the event comprises an upgrade of at least one of the plurality of devices from a first version to a second version.

3. The method of claim 2, wherein the upgrade of the at least one of the plurality of devices comprises a plurality of operations applied in a sequence to the at least one of the plurality of devices.

4. The method of claim 3, wherein the value associated with the event represents a most recent of the plurality of operations applied to the at least one of the plurality of devices.

5. The method of claim 1, the plurality of attributes comprising a geographic location.

6. The method of claim 1, the plurality of attributes comprising a version level.

7. The method of claim 1, the plurality of attributes comprising a current operational status.

8. The method of claim 1, further comprising:
accessing an updated value of at least one of the plurality of attributes for at least one of the plurality of devices during the display of the representation of the at least some of the identified devices;
comparing the filter set to the updated value of the at least one of the plurality of attributes for the at least one of the plurality of devices to newly identify those of the plurality of devices that satisfy all of the one or more filters of the filter set; and
causing display of a presentation of at least some of the newly identified devices.

9. The method of claim 1, wherein:
the representation of at least some of the identified devices comprises a first representation of at least some of the identified devices;
the first representation of at least some of the identified devices is displayed in a first user interface configured to initiate a first set of operations corresponding to the identified devices; and
the method further comprises:
receiving a user input to switch from the first user interface to a second user interface configured to initiate a second set of operations corresponding to the identified devices; and
causing display of the second user interface in response to the user input, the second user interface including a second representation of the at least some of the identified devices.

10. The method of claim 9, wherein the first set of operations comprises upgrading the identified devices to a current version level.

11. The method of claim 10, wherein the second set of operations comprises accessing analytical information generated by the identified devices.

12. The method of claim 10, wherein the second set of operations comprises determining a connectivity of the identified devices to a communication network.

13. The method of claim 1, further comprising:
identifying the plurality of devices;
determining the plurality of attributes based on the identifying of the plurality of devices;
causing presentation of the plurality of attributes as first available user selections; and
receiving a user selection of each of the one or more filters of the filter set via the first available user selections.

14. The method of claim 13, further comprising:
causing presentation of second available user selections in response to receiving the user selection of one of the one or more filters; and
receiving a user selection of the filter value for the one of the one or more filters via the second available user selections.

15. The method of claim 1, wherein the representation of at least some of the identified devices comprises a table of the at least some of the identified devices, the table comprising the value of at least one of the plurality of attributes for each of the at least some of the identified devices.

16. The method of claim 1, wherein the representation of at least some of the identified devices comprises a map indicating geographical locations of the at least some of the identified devices.

17. The method of claim 1, wherein the representation of at least some of the identified devices comprises a graphical representation indicating a percentage of the identified devices relative to the plurality of devices.

18. The method of claim 1, wherein:
the representation of at least some of the identified devices comprises a first representation; and
the method further comprises:
receiving a first user input during the display of the representation of the at least some of the identified devices;
storing identifiers for the identified devices;
receiving a second user input after the storing of the identifiers for the identified devices; and
causing display of a second representation of the at least some of the identified devices in response to receiving the second input, the second representation comprising an indication of a current status of the at least some of the identified devices.

19. A system comprising:
a plurality of devices, the devices being internet-of-things (IoT) devices operating and disposed in an industrial environment;
one or more hardware processors; and
a memory storing instructions that, when executed by at least one of the one or more hardware processors, cause the system to perform operations comprising:
accessing a value for each of a plurality of attributes for each of the plurality of devices;
accessing a filter set comprising one or more filters from a database, wherein each of the one or more filters comprises one of the plurality of attributes, a filter value, and a relational operator relating the one of the plurality of attributes to the filter value, the attribute of at least one of the filters indicating an event applicable to individual ones of the plurality of devices, the filter value of the at least one of the filters indicating whether to filter the plurality of devices based on the presence or absence of a previous occurrence of the event;
comparing the filter set to the values of the plurality of attributes of each of the plurality of devices to identify those of the plurality of devices that satisfy all of the one or more filters of the filter set; and
when a selected first one of the plurality of devices satisfy all of the one or more filters of the filter set, causing display of a representation of at least some of the identified devices on a display device;
when a selected second one of the plurality of devices satisfy all of the one or more filters of the filter set, causing the sending of commands to one or more of the plurality of devices;

when a selected third one of the plurality of devices satisfy all of the one or more filters of the filter set, monitoring the operation of one or more of the plurality of devices;
  wherein the attributes changes over time based upon events that occur at the plurality of electronic devices and the events include an upgrade of at least one of the plurality of devices from a first version to a second version such that a fourth one of the plurality of devices satisfies all of the one or more filters of the filter set at a first time and fails to satisfy one or more filters of the filter set at a second time, and wherein a display showing the fourth one of the plurality of devices changes from the first time to the second time in accordance with changes in attribute values at the fourth device.

20. A non-transitory computer-readable storage medium storing instructions that, when executed by at least one hardware processor of a machine, cause the machine to perform operations comprising:
  deploying a plurality of devices, the devices being internet-of-things (IoT) devices operating and disposed in an industrial environment;
  accessing a value for each of a plurality of attributes for each of the plurality of devices;
  accessing a filter set comprising one or more filters from a database, wherein each of the one or more filters comprises one of the plurality of attributes, a filter value, and a relational operator relating the one of the plurality of attributes to the filter value, the attribute of at least one of the filters indicating an event applicable to individual ones of the plurality of devices, the filter value of the at least one of the filters indicating whether to filter the plurality of devices based on the presence or absence of a previous occurrence of the event;
  comparing the filter set to the values of the plurality of attributes of each of the plurality of devices to identify those of the plurality of devices that satisfy all of the one or more filters of the filter set; and
  causing display of a representation of at least some of the identified devices on a display device;
  when a selected second one of the plurality of devices satisfy all of the one or more filters of the filter set, causing the sending of commands to one or more of the plurality of devices;
  when a selected third one of the plurality of devices satisfy all of the one or more filters of the filter set, monitoring the operation of one or more of the plurality of devices;
    wherein the attributes change over time based upon events that occur at the plurality of electronic devices and the events include an upgrade of at least one of the plurality of devices from a first version to a second version such that a fourth one of the plurality of devices satisfies all of the one or more filters of the filter set at a first time and fails to satisfy one or more filters of the filter set at a second time, and wherein a display showing the fourth one of the plurality of devices changes from the first time to the second time in accordance with changes in attribute values at the fourth device.

* * * * *